United States Patent Office 2,736,712
Patented Feb. 28, 1956

2,736,712

LUMINESCENT MAGNESIUM OXIDE

William A. Runciman, Harrow Weald, England, assignor to General Electric Company, a corporation of New York No Drawing. Application August 10, 1954, Serial No. 449,005

Claims priority, application Great Britain September 24, 1953

3 Claims. (Cl. 252—301.4)

This invention relates to luminescent materials, and has for one of its objects the provision of luminescent materials which differ from previously known luminescent materials in their composition. The invention also relates to a method of manufacturing luminescent materials and to combinations of such materials with electrical means for exciting them to luminescence, especially to cathode ray tubes.

It is known that crystalline magnesium oxide is activated by chromium to give luminescence of a deep red color under excitation by cathode rays, and it is an object of the present invention to provide a chromium-activated magnesium oxide material showing luminescence of improved intensity in comparison with the known material.

According to the invention, a luminescent material capable of being excited to luminescence by cathode rays consists of crystalline magnesium oxide containing in the crystal structure both chromium as activator, and at least one of the metals lithium, sodium, potassium, thallium in the monovalent form, as an intensifier of the luminescence.

The preferred range of the chromium content of the luminescent materials of the invention, expressed as an atomic percentage, that is to say indicating the ratio of chromium atoms to magnesium atoms in the material, is from .01% to 1%. The proportion of monovalent metal, also expressed as an atomic percentage, is preferably in the range of 0.1% to 10%.

The monovalent metals lithium, sodium, potassium, thallium are incapable by themselves of activating the magnesium oxide, but by incorporating one or more of these monovalent metals in chromium-activated magnesium oxide, it is possible to obtain luminescent materials showing the deep red luminescence produced by the chromium activator at a considerably greater intensity than that obtained with chromium-activated magnesium oxide in the absence of any additives. This effect is believed to be due to charge compensation, that is to say, it is believed that the excess positive charge present in the crystal structure of the activated magnesium oxide, as a result of the substitution of divalent magnesium ions by trivalent chromium ions, is compensated by substituting further magnesium ions by suitable monovalent positive ions.

For maximum efficiency a luminescent material in accordance with the invention should contain at least sufficient monovalent positive ions to compensate all of the chromium ions present; the presence of an excess of the monovalent ions, up to about ten times the amount theoretically required for compensation, is immaterial.

Luminescent materials in accordance with the invention may be prepared by heating mixtures of the oxides, or compounds capable of forming the oxides on heating, of magnesium, chromium and the appropriate monovalent metal, at a temperature in the range of 800–1200° C. in air for an hour or longer. The oxides or other compounds may be mixed in the dry state, or may be mixed with water to form a paste, or one or more of these compounds may be dissolved in water prior to mixing with the remaining ingredients. The heating is preferably carried out at about 1000° C.

It will be understood that the materials employed for the preparation of the luminescent materials of the invention must be of a high degree of purity, as is usual in the manufacture of luminescent materials.

The preparation of some specific materials in accordance with the invention will now be described by way of example.

*Example 1*

The materials employed for the preparation of the luminescent material are dry magnesium oxide, an aqueous solution of chromium trioxide, and dry lithium carbonate. The quantitities used, to produce a mixture comprising magnesium oxide with .2% of chromium and 5% of lithium (atomic percentages in relation to magnesium atoms), are as follows:

2.0 grams of magnesium oxide, MgO.
5.3 cc. of chromium trioxide ($CrO_3$) solution containing 0.1% by weight of chromium.
0.093 gram of lithium carbonate, $Li_2CO_3$.

These constituents are mixed to form a paste which is dried at 250° C. The dried material is ground, heated in air at 1000° C. for an hour, re-ground, and re-heated at 1000° C. for a further period of an hour.

The product shows deep red luminescence when excited by cathode rays.

*Example 2*

The materials used for the preparation of the luminescent material of this example are dry magnesium oxide and lithium carbonate, a chromium trioxide solution of the same concentration as that used in Example 1, and an aqueous solution of thallous sulphate, $Tl_2SO_4$, containing 1% by weight of thallium. The quantities used, to produce a mixture comprising magnesium oxide with, as atomic percentages of the magnesium, 0.2% chromium, 5% lithium and 0.5% thallium, are:

2.0 grams of magnesium oxide, MgO.
5.3 cc. of the $CrO_3$ solution.
0.093 gram of lithium carbonate, $Li_2CO_3$.
5.1 cc. of the $Tl_2SO_4$ solution.

These materials are mixed to form a paste which is dried at 250° C. The dried mixture is ground, heated in air at 1000° C. for an hour, re-ground, and re-heated at 1000° C. for a further period of an hour.

The product shows deep red luminescence under excitation by cathode rays.

What I claim as new and desire to secure by Letters Patent of the United States is:

1. A luminescent material consisting essentially of crystalline magnesium oxide containing in the crystal structure both activating chromium in a ratio of from .01% to 1% chromium atoms to magnesium atoms and at least one of the metals lithium, sodium, potassium and thallium in the monovalent form and in a ratio from 0.1% to 10% of atoms of said metal to magnesium atoms.

2. A luminescent material consisting essentially of crystalline magnesium oxide containing in the crystal structure both activating chromium in an atomic percentage of about .2% and lithium in an atomic percentage of about 5%.

3. A luminescent material consisting essentially of crystalline magnesium oxide containing in the crystal structure both activating chromium in an atomic percentage of about 0.2% together with lithium in an atomic percentage of about 5% and thallium in an atomic percentage of about 0.5%.

References Cited in the file of this patent

FOREIGN PATENTS 548,997   Great Britain _____ Nov. 2, 1942

OTHER REFERENCES

Pringsheim: Fluorescence and Phosphorescence, 1949, Interscience Publishers, Inc., pp. 639, 640.